(12) United States Patent
Chen et al.

(10) Patent No.: US 7,496,960 B1
(45) Date of Patent: Feb. 24, 2009

(54) TRACKING AND REPORTING OF COMPUTER VIRUS INFORMATION

(75) Inventors: Eva Chen, Pasadena, CA (US); Jimmy Sun, Cupertino, CA (US); Terrence Chou, Taipei (TW); Steven Deutsch, San Francisco, CA (US); Mark Havran, San Jose, CA (US)

(73) Assignee: Trend Micro, Inc. (JP)

( * ) Notice: Subject to any disclaimer, the term of this patent is extended or adjusted under 35 U.S.C. 154(b) by 872 days.

(21) Appl. No.: 09/702,289

(22) Filed: Oct. 30, 2000

(51) Int. Cl.
*G06F 11/00* (2006.01)
*G06F 12/14* (2006.01)
*G06F 12/16* (2006.01)
*G06F 15/18* (2006.01)
*G08B 23/00* (2006.01)

(52) U.S. Cl. ...................................................... 726/22
(58) Field of Classification Search ................ 713/188, 713/200, 201
See application file for complete search history.

(56) References Cited

U.S. PATENT DOCUMENTS

| | | | | |
|---|---|---|---|---|
| 5,960,170 A | * | 9/1999 | Chen et al. | 714/38 |
| 6,088,803 A | * | 7/2000 | Tso et al. | 713/201 |
| 6,088,804 A | * | 7/2000 | Hill et al. | 726/25 |
| 6,275,937 B1 | * | 8/2001 | Hailpern et al. | 713/188 |
| 6,453,345 B2 | * | 9/2002 | Trcka et al. | 709/224 |
| 6,721,721 B1 | * | 4/2004 | Bates et al. | 707/1 |
| 6,785,732 B1 | * | 8/2004 | Bates et al. | 709/232 |

OTHER PUBLICATIONS www.trendmicro.com, Jan. 1989.*

* cited by examiner

*Primary Examiner*—Emmanual L. Moise
*Assistant Examiner*—Nadia Khoshnoodi
(74) *Attorney, Agent, or Firm*—Beyer Law Group LLP

(57) ABSTRACT

An apparatus and method for providing real-time tracking of virus information as reported from various computers on a distributed computer network. Each client computer on the distributed network contacts an anti-virus scanning site. The site provides a small program or applet that resides in temporary memory of the client computer. The client-user invokes the scan with supplied pattern updates for detecting recent viruses. When the scan has been completed, the user is prompted to supply a country of origin. The name of the virus, its frequency of occurrence, and the country are forwarded as a virus scan log to a virus tracking server, which receives the virus information and thereafter stores it in a database server, which is used to further calculate virus trace display information. A tracking user contacts the virus tracking server and receives map information, which traces the virus activity. The maps show, according to user preference, the names of the viruses encountered in each country, and their frequencies of occurrence.

26 Claims, 17 Drawing Sheets

TRACKING AND REPORTING OF COMPUTER VIRUS INFORMATION

FIELD OF THE INVENTION

The present invention relates generally to apparatus and method configurations for tracking virus infection data from end user computers on a distributed network, and thereafter providing a real-time display of results pertaining to the viruses found.

BACKGROUND OF THE INVENTION

Computer networks provide an efficient means for transporting data between workstations or terminals on (or connected to) the network. Such networks can consist of Local Area Networks (LANs), which are generally restricted to one geographical area or location. Such networks can also include Wide Area Networks (WANs) which connect a number of machines over a larger geographic area. The Internet is also an example of one such network. The Internet is a worldwide system of computer networks—or a network of networks—wherein users at any one computer can, if they have permission, get information from any other computer. The Internet was conceived by the Advanced Research Projects Agency (ARPA) of the U.S. government in 1969 and was first known as the ARPANet. The original aim was to create a network that would allow users of a research computer at one university to be able to "talk to" research computers at other universities. A side benefit of the ARPANet design provided that messages can be routed or rerouted in more than one direction, and that the network can continue to function even if parts of it were destroyed in the event of a military attack or other disaster (including simple down-time of component parts).

Today, the Internet is a public, cooperative, and self-sustaining facility accessible to hundreds of millions of people worldwide. The Internet is providing ever increasing opportunities for persons across the world to interact with each other via a relatively cheap medium of communication. A typical interaction consists of a user (or client) using a browser (or other such device) to contact a web server (i.e. website) with a request for information (i.e. a webpage, data, or the like). The information exchanged between the web server and the client might be in the form of HTTP requests and responses.

Widespread usage of the Internet has led to more widespread occurrences of certain destructive computer viruses. This include (for instance) the recent "Melissa" and "I Love You" viruses, which caused extensive network damage. A virus is a piece of programming code usually disguised as something else that causes some unexpected and usually undesirable event (for the victim). Viruses are often designed so that they automatically spread to other computer users across network connections. For instance, viruses can be transmitted by sending them as attachments to an e-mail note, by downloading infected programming from other sites, and/or be imported into a computer from a diskette or CD. The source application that deals with the e-mail note, downloaded file, or diskette is often unaware of the virus. Some viruses wreak their effect as soon as their code is executed; other viruses lie dormant until circumstances cause their code to be executed by the computer. Some viruses are playful in intent and effect simple messages to the user, while others can be quite harmful, thereby erasing data, causing a hard disk to require reformatting, or clogging networks with unnecessary traffic.

Generally, there are three main classes of viruses: (1) File infectors. Some file infector viruses attach themselves to program files, usually selected .COM or .EXE files. Some can infect any program for which execution is requested, including .SYS, .OVL, .PRG, and .MNU files. When the program is loaded, the virus is loaded as well. Other file infector viruses arrive as wholly-contained programs or scripts sent as an attachment to an e-mail note. (2) System or boot-record infectors. These viruses infect executable code found in certain system areas on a disk. They attach to the DOS boot sector on diskettes or the Master Boot Record on hard disks. A typical scenario is for a user to receive a diskette from an innocent source that contains a boot disk virus. When the operating system is running, files on the diskette can be read without triggering the boot disk virus. However, if the diskette is in the drive, and the computer is turned on (or the OS is reloaded), then the computer will look first in the computer's "A:" drive, find the diskette with its boot disk virus, load it, and make it temporarily impossible to use the hard disk. (3) Macro viruses. These are among the most common viruses, and often do the least damage. Macro viruses infect applications (such as Microsoft Word) and typically insert unwanted words or phrases into an application.

The best protection against a virus is to know the origin of each program or file that is loaded into a computer, or opened from an e-mail program, or the like. Since this generally difficult, there is wide variety of anti-virus software on the market. Anti-virus (or "anti-viral") software is a class of program that searches a computer's hard drive and floppy disks for any known or potential viruses. The market for this kind of program has expanded because of Internet growth and the increasing use of the Internet by businesses concerned about protecting their computer assets. Virus warnings can thereafter be sent to the user pertaining to any findings.

Tracking of viruses is becoming important in the evidentiary search to identify any parties that might have been involved in the origination and distribution of a virus. There are presently an estimated 6 to 8 new viruses being unleashed everyday, with most of them being spread through the Internet. Notably, a common virus 10 years ago in the United States might have needed more than a year to propagate and become well-known in Asia. Now, through the use of email and the Internet, it only takes a matter of days or even hours for a virus to spread worldwide. Virus tracking thereby aids in finding and distributing a "cure" for such viruses. For instance, if a certain set of networks, in a certain part of the world were infected (moreso) by a particular virus, then this knowledge might aid in tracking down the source and/or type of the virus. Moreover, the affected networks and computers could be more quickly remedied if the severity of the infections, and the location of the infections, are known on a wider scale.

Prior anti-virus systems (i.e., McAfee, Norton, and the like) have not provided any real-time methods for tracking virus information, or the level of virus activity, on a wide distributed-network scale (i.e., systemwide, nationwide, worldwide activity). Certain popular anti-viral software is based entirely upon an online scanner model. A user contacts the site of an anti-virus software provider, and is prompted to download a program. The software—which now completely resides on the user's computer—is thereafter triggered from the web (or network), and scans the user's computer. The user is alerted to any viruses found. However, the downloaded anti-virus software does not perform any real-time communication of the results back to anti-virus server site to form a collective analysis. The user computer might communicate viral information back to the anti-virus server via email messages, or the like. However, the latency involved with such reporting methods will not provide for any real-time display and analysis of the virus scan results.

Accordingly, what is needed in the field is a system for real-time tracking of viruses from various computers on a distributed computer network. A central tracking server might be employed to receive data pertaining to the anti-virus scanning results from each computer on the network. The system should thereafter be capable of displaying the real-time results in various formats, including levels of viral activity as reported from various geographic locations, or the like. The wide-scale and real-time tracking of viruses would thereby aid in understanding, and proactively preventing the spread of such viruses.

SUMMARY OF THE INVENTION

To achieve the foregoing, and in accordance with the purpose of the present invention, a apparatus and method are disclosed that provide for real-time tracking of virus information as reported from various computers on a distributed computer network. Each client computer on the distributed network contacts an anti-virus scanning website. The website provides a small program or applet that resides in temporary memory of the client computer. The client-user invokes the scan, which receives updates of pattern files from the website via the online connection. When the scan has been completed, the user is prompted to supply a country of origin. The name of the virus, its frequency of occurrence, and the country are forwarded as a virus scan log to a World Virus Tracking Center (WVTC). For security and privacy reasons, no further identification information pertaining to the infected client computer is used.

The WVTC is a server based system that might run on any of a variety of devices. The WVTC receives the virus information and further transmits it to a main database, which is used for storing the scan log information and calculating the frequencies of occurrence in various geographic areas. A user computer (i.e., tracking user or client user) can then be used to contact the WVTC server and display geographic maps (i.e. worldwide). The maps show, according to user preferences, the names of the viruses encountered in each country, and their frequencies of occurrence. Display blocks showing virus names and the number of units infected are displayed in response to user inputs to pinpoint certain geographical areas. Other compilations, including for instance "top-ten" lists of viruses are also maintained for reference purposes.

The present system can therefore be used as an analysis tool to track the real-time spread patterns of viruses on any geographic level specified by the user. The present invention provides tools to analyze worldwide virus trends as they occur. The present tool can thereby assist in predicting virus outbreaks and preventing them proactively.

According to one aspect of the present invention, a real-time virus tracking and display apparatus is provided for use with a distributed computer network, the apparatus comprising: a plurality of client users having potentially infected client computers; at least one anti-virus scanning server accessible via the distributed computer network, whereby the client users contact the server to facilitate scanning of the client computers; a scan log which is sent back from each client user detailing certain results of the virus scan on each client computer; a virus-tracking server for real-time receiving and processing the scan log information; a database server associated with the virus-tracking server for real-time receiving and processing of the scan log information into virus-tracking information; and at least one virus tracking display mode accessible by a tracking user from the virus tracking server, the display mode providing real-time updates of virus information pertaining to the scan logs.

According to another aspect of the present invention, A method is provided for real-time virus tracking and display for use with a distributed computer network, the method comprising: providing an anti-virus scanning program on at least one anti-virus scanning server accessible via the distributed computer network; invoking the anti-virus scanning program from a plurality of client users having potentially infected client computers; generating a scan log from each scanned computer and sending it back from each client user, the scan log detailing certain results of the virus scan on each client computer; receiving and processing the scan log information in real-time via a virus-tracking server associated with the distributed computer network; processing the scan log information into virus tracing information and storing it on a database server associated with the virus-tracking server; retrieving the virus tracing information, and displaying a real-time trace on a tracking user device.

These and other aspects and advantages of the present invention will become apparent upon analysis of the following detailed descriptions and studying the various figures and drawings.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail so that the present invention will not be unnecessarily obscured in any way.

The present invention provides for a virus tracking and analysis system capable of detecting and tracking viruses from various computers on a distributed computer network. A user computer contacts an anti-virus software server having a website configured to provide anti-virus scanning. The website downloads a small program, or applet, that runs locally on the user's machine. The program locates any viruses on the user computer, and then reports the virus information back to a World Virus Tracking Center (WVTC) system. The virus information might include the virus name, location, frequency of occurrence, and so forth.

Figure 1A:
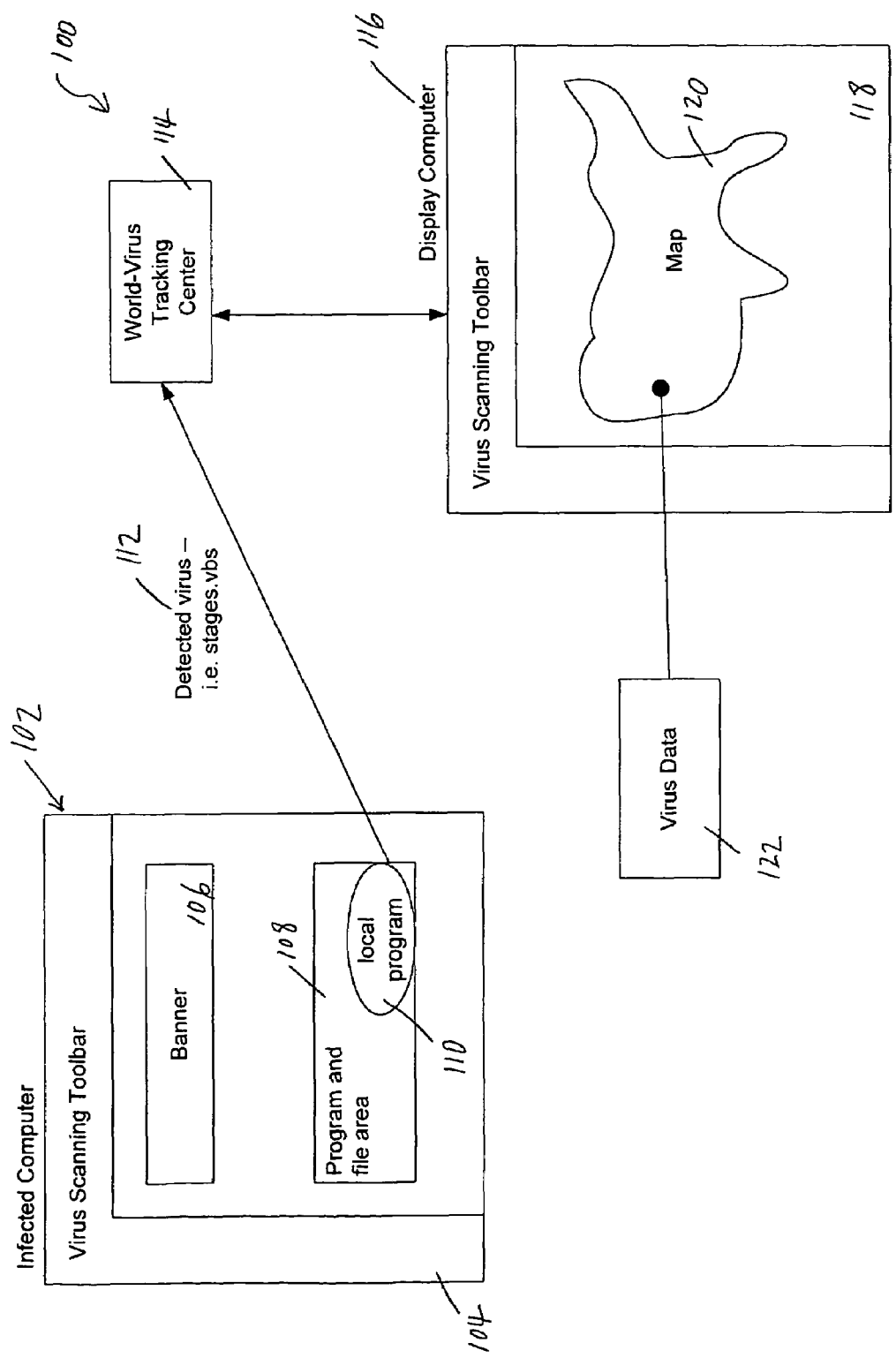
FIG. 1A is a representative block diagram, according to one aspect of the present invention, showing an overview of the system for providing real-time virus tracking.
Figure 1B:
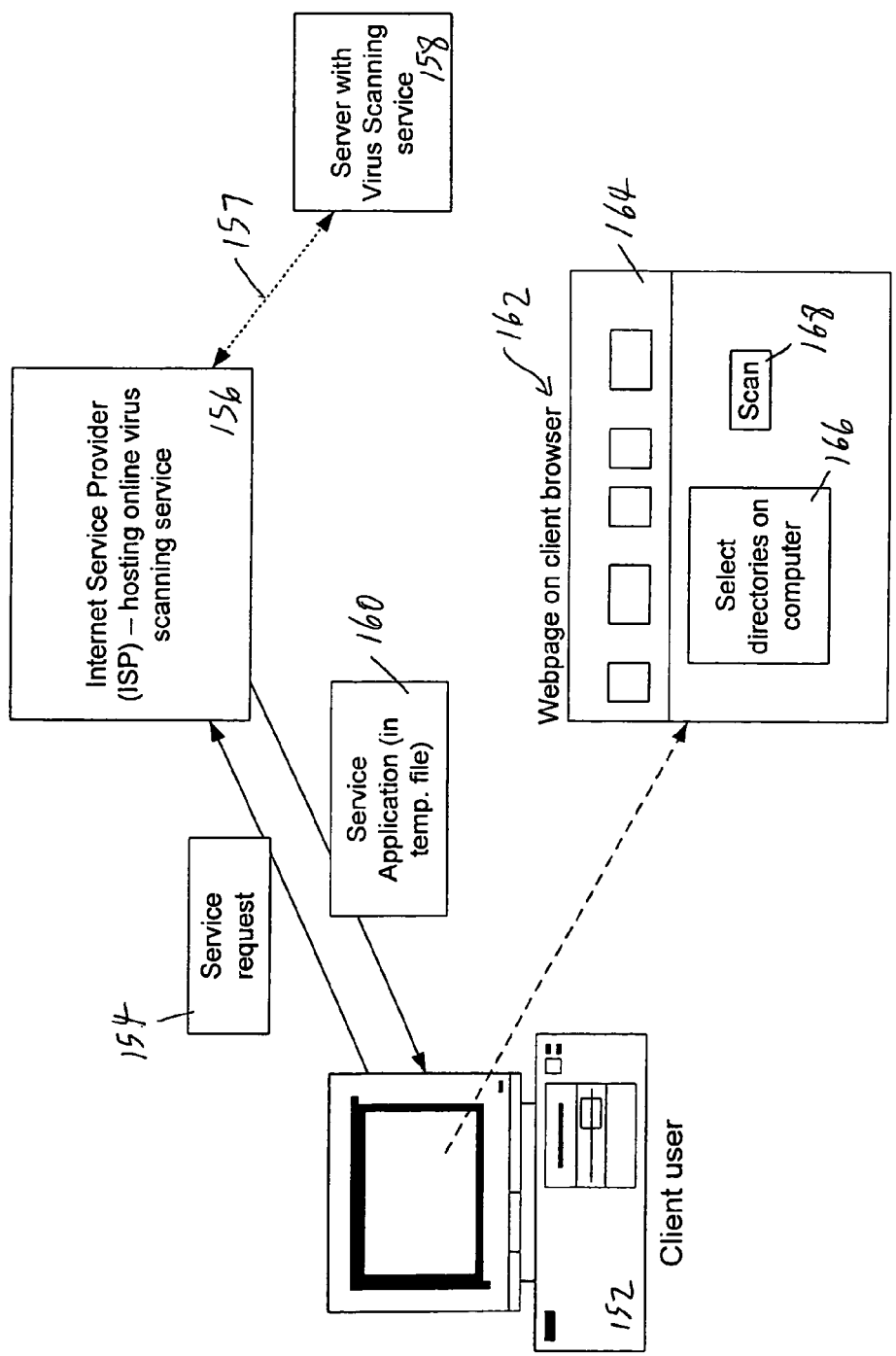
FIG. 1B is a representative block diagram, according to one aspect of the present invention, showing an online scan being performed on a client computer.

Referring now to FIG. 1A, a block diagram 100 is shown of representative elements comprising an embodiment of the system. An infected computer 102 is shown running an online virus scanning program, such as HouseCall from Trend Micro Incorporated. FIG. 1B further shows representative elements 150 demonstrating the operation of this type of online virus-scanning service. A client user 152 is shown sending a service request 154 to an Internet Service Provider (ISP) 156. The ISP or web server 156 can be configured to host the associated online virus scanning service. Alternatively the ISP can provide hyperlinks or bookmarks 157 to the scanning service provided on host server 158. The user request 154 produces a response of a service application 160, which includes a small program, applet, control, or the like (i.e. Java applet or ActiveX control). This program resides in temporary memory of the user's computer. A sample webpage 162 is shown which provides the user the interactive option to select areas to be scanned. The webpage 162 includes standard browser toolbar operators 164. A window 166 shows file directories on the user's computer that might be selected for virus scanning. A click-through button 168 is provided to initiate the scan. Once initiated, the service application 160 causes the user computer 152 to interact with the hosted anti-virus scanning service to thereby scan and eliminate any viruses.

This type of anti-virus scanning does not run in the background of the computer, or continually (or periodically) check for viruses. It has been found that such anti-virus scanning configurations tend to slow down system performance, and often do so at inopportune times. Users have frequently been known to turn off the periodic scanning function in order to avoid any decreased system performance. Instead, the anti-virus scanning of the present system is invoked only when the user is visiting the appropriate anti-virus server webpage(s).

Referring again to FIG. 1A, the display area for the invoked virus scanning application includes a virus scanning toolbar 104. A banner 106 might be used to encourage and remind users to initiate scans on a regular basis via contacting the website (or host) of the online virus scanning service. The program and file area 108 shows the identification of a local program 110, which is infected by a virus. The detected virus 112 is identified by its common name (i.e., "stages" or stages.vbs), and information pertaining to its detection is thereafter sent to a World Virus Tracking Center (WVTC) 114. The WVTC might be comprised of a server or network of servers. Example WVTC servers might include (but are not limited to) the following: SQL Server 7.0; Windows NT Server 4.0, SP5, IIS 4.0; JRUN 2.3.3; JDK 1.2.2, and a Compaq server with 4 CPUs and at least 1 GB of memory.

The WVTC therefore serves to collect various data pertaining to detected viruses on distributed computers that use the online virus scanning service. A display computer 116 can thereafter be used to contact the WVTC 114 and use related applications to show tracking information about the virus detected. For instance the display area 118 shows a representative map 120. A pointing device (or the like) can be used to pinpoint various areas on the geographic display and show virus data 122 relating to various computers reporting from that area. This virus data 122 might include the "top ten" viruses worldwide, along with their frequency of infection.

The overall solution therefore incorporates a front-end and a back-end system to collect and track the virus information. The front-end system includes the virus-scanning service, such as HouseCall, which collects virus data from worldwide computer users. This web-based system enables all HouseCall users to send information back to the server regarding the virus name, and how many viruses were found during their session of HouseCall usage. The back-end of the system includes the WVTC device(s), which consolidates the virus scan log (coming from the various computer users) and compiles the tracking statistics for display. The back-end system uses this information to dynamically update a chart (accessible via the web) which displays the virus information found. While the front-end client has been described as running Housecall, the agent that sends the virus information back to the back-end system is intended to be portable to other scanning products (i.e., TVCS, eDoctor, InterScan, etc.).

Figure 2:
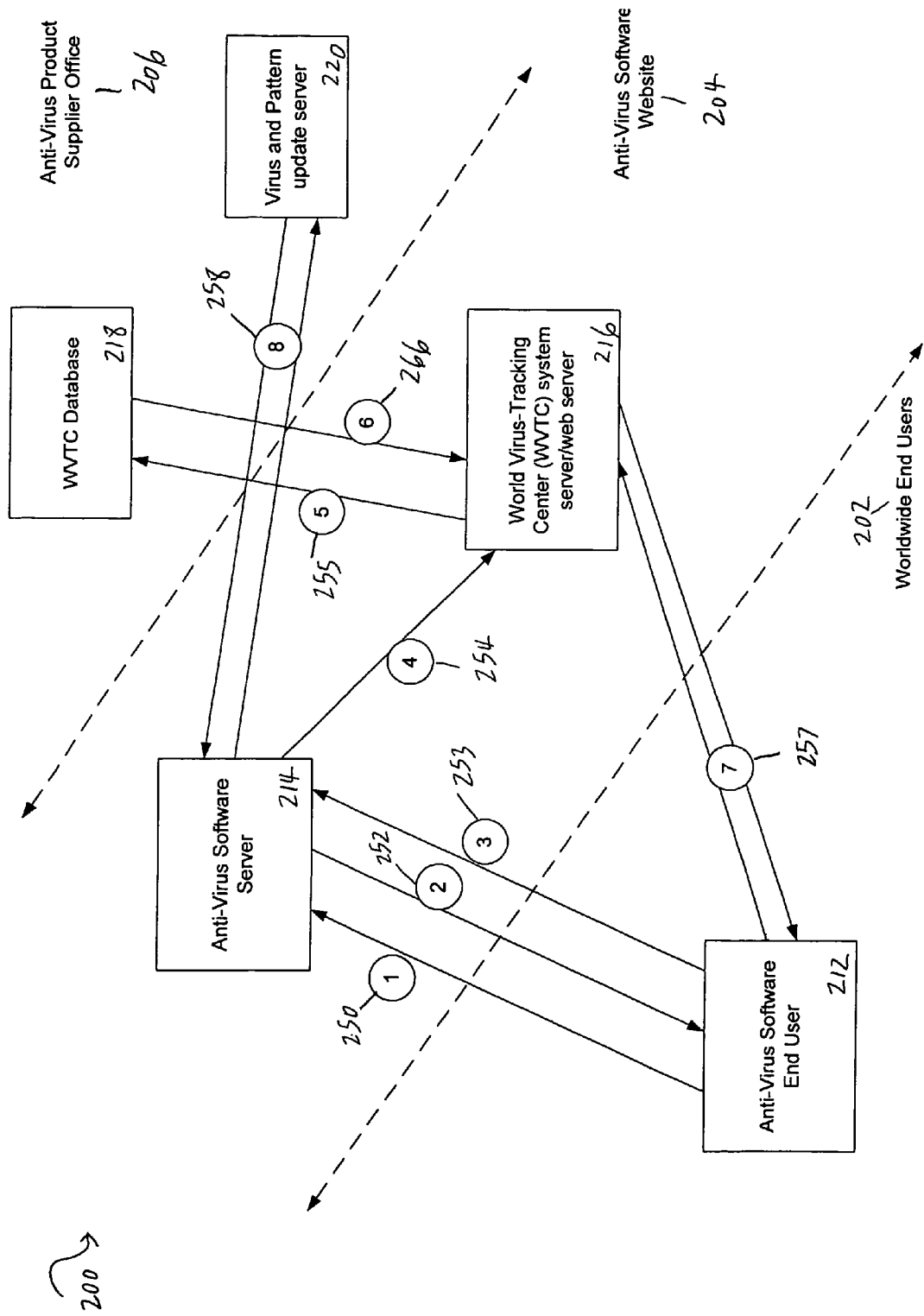
FIG. 2 is a block diagram, showing the sequential flow of information and interaction between representative end users, an anti-virus server, a virus tracking center server, and a centralized office for storing virus log information.

Referring now to FIG. 2, a block diagram 200 is shown of certain representative elements and the sequential flow of data that might flow between them. This diagram is divided into three functional areas having different devices associated with each area. The first area 202 is associated with the worldwide end users. The second area 204 is associated with the anti-virus software website (i.e., HouseCall website), or the like. The third area 206 is associated with the a central office that might supply the anti-virus scanning product. Representative steps one through eight demonstrate the example flow of data between the three areas.

According to this example flow of data, the first step 250 shows an end user 212 (in the first area) visiting an anti-virus software server 214 (in the second area) for online virus scanning services. The second step 252 shows the anti-virus server 214 providing an online scan of the end user computer. After scanning, the third step 253 shows the end user (i.e. HouseCall client) sending back a scan log to the server 214 to be used in data tracking and data summaries. The fourth step 254 next shows the anti-virus server 214 sending the summary data to a WVTC system server (or web server) 216 (in the second area).

A WVTC database 218 is shown associated with the third area. This database would normally be located and maintained at a centralized location of the virus scanning product supplier. This database 218 becomes the central repository of virus information, which has been reported from locations all over the world by end users invoking HouseCall (or the like). The fifth step 255 shows the WVTC 216 sending an update of virus information (as gathered from the end users) to the WVTC database 218. The sixth step 256 shows the WVTC database being used to update virus tracking information to the WVTC server 216 on a periodic basis. The same end user 212 (or other end users, which might be referred to as tracking users) might wish to display the virus tracking information on their display device. The seventh step 257 shows the end user 212 interacting continually with the WVTC 216 in order to obtain real-time virus tracking information directly from the associated WebPages provided by the WVTC 216. Such pages will include maps, and the like, for conveniently conveying the virus tracking information.

Finally, the continual outbreak of new viruses provides the need for a centralized server 220 (associated with area three) that keeps virus and pattern updates, as derived from the information coming into the WVTC database 218. The eighth step 258 shows the anti-virus software server 214 requesting and retrieving information from this server 220 in order to perform the most up-to-date scan of viruses on the end user machines 212.

Figure 3:
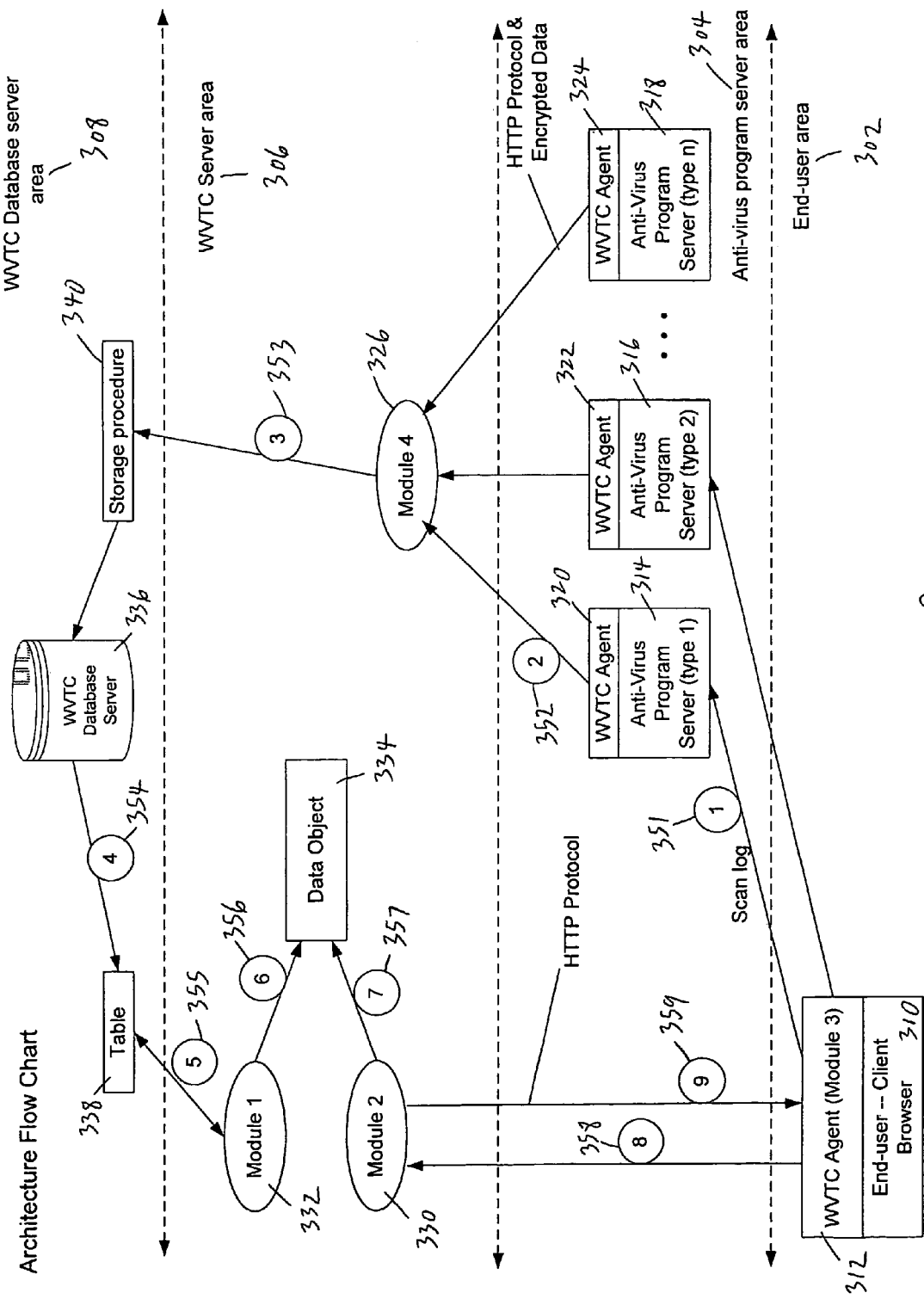
FIG. 3 is a block diagram, showing the sequential flow of information and interaction between representative devices associated with an end-user area, an anti-virus program server area, a World Virus Tracking Center (WVTC) server area, and a WVTC Database server area.

The present architecture makes use of certain development tools, or modules, to implement the flow of data between the server areas that comprise the system. FIG. 3 shows a block diagram of certain representative elements associated with the present system and the flow of data there-between, with further details beyond those shown in FIG. 2. This chart is divided into four general areas having associated devices. The first area 302 is associated with end users. The second area 304 is associated with the anti-virus program servers. The third area 306 is associated with the WVTC server. The fourth area 308 is associated with the WVTC data server. Representative steps one through nine demonstrate the example flow of data between the four areas. The numbered modules are explained in further detail below.

The first area 302 shows an end-user 310, or most typically a client operating a browser device. A WVTC agent program (or module 3) 312, is shown associated with the end user 310. The first step 351 shows the end user device 310 sending a scan log to a first anti-virus program server 314 (in area two). The server 314 might be of first type (i.e., HouseCall). A WVTC agent program 320 is associated with the server 314. A second anti-virus program server 316 is shown associated with a WVTC agent program 322. This server 316 might be of a second type (i.e., eDoctor). Still another anti-virus program server 318 is shown associated with a WVTC agent program 324. This server 318 might be of an "nth" type (i.e., House-Call, eDoctor, or any other online anti-virus scanning application). The anti-virus servers 314, 316, and 318 are shown to demonstrate the applicability of the present invention to many types of anti-virus scanning programs, including PC or corporate based systems. Similar scan logs might be sent to each server from the WVTC agent associated with end users.

The second step 352 shows the WVTC agent 320 sending information to a software module (module 4) 326 located in the third area 306. This module is configured to run on the WVTC server associated with this area 306. This module includes a server side program, which allows servers 314, 316, and 318 (i.e., HouseCall server, eDoctor server, etc.) to use HTTP protocol to send encrypted data. The third step 353 shows the encrypted data being sent to a storage procedure 340 in the WVTC Database server area 308. Through this procedure the data is thereafter stored in the WVTC Database server 336. This database is the main storage area of the virus log.

As stated above, a user might make an inquiry to view the worldwide virus tracking information associated with the virus scans on the various end user computers. When an inquiry is made, the fourth step 354 shows a database table 338 (in area four) being updated with WVTC Database information. The table could be a part of the database, or maintained separately. A file might also be used. The WVTC server area 306 includes a software module 332 (module 1) and software module 330 (module 2) in association with a data object 334. The data object might also be configured as a file (or the like). The fifth step 355 shows the WVTC server retrieving the data from the data table 338. Module 1 includes a server side scheduling program to facilitate retrieving the data from the database and writing it to the data object. The seventh step 357 shows module 2 retrieving the data object. Module 2 includes a server side program, which further allows module 3 to the get the data object through HTTP protocol.

In the eighth step 358, the end user (client) 310 is shown retrieving the information from module 2 (330) via a common gateway interface (CGI). The CGI is a standard way (part of HTTP) for a web server to pass a web user's request to an application program, and thereafter receive data back from the application program to forward to the user. In the ninth step 359, the virus tracking information is sent to the end user 310, via HTTP protocol, through the WVTC Agent (module 3) 312. Module 3 is a client side program used to display a geographical map based upon the information in the data object 334.

The modules and database might be implemented in many different ways. One aspect of the present invention implements the modules and database as follows:

(a) Module 1 is a Windows NT service, implemented using (for instance) Microsoft Visual C++6.0. Module 1 is used for polling the database server to get a query result. Module 1 protocol uses an OBDC connection to connect to the database server. Module 1 further uses shared memory to store the data object in order to keep the information for module 2. Module 1 is configured to run approximately every 10 seconds.

(b) Module 2 is a Win32 CGI program, implemented using (for instance) Microsoft Visual C++6.0, via a common module CGIUTIL.LIB. Module 2 is configured to receive a request from the WVTC client module 3, and send the data for display. Module 2 uses non-encryption HTTP protocol, and receives a URL request from the client side to this CGI program. Module 2 is invoked upon every request from the client side.

(c) Module 3 is a Java applet program, implemented using JDK 1.1. This Java applet runs in the client browser to display the world trace map. Module 3 protocol uses non-encryption HTTP protocol to send a URL request to the server side CGI program (module 2). Module 3 runs approximately every 10 seconds, but can be configured in the server side HTML page.

(d) Module 4 is a Servlet program, implemented using Java 2 SDK. This Servlet program receives the virus scan log from the various servers (i.e., HouseCall server, eDoctor server, etc.) Module 4 protocol includes using non-encryption HTTP. A format URL query string is received that contains the anti-virus product scanning log information. The protocol further utilizes a JDBC-ODBC bridge to connect the database server and send a store procedure command to write the virus log. Note that JDBC (Java Database Connectivity) is an application program interface (API) specification for connecting programs written in Java to the data in popular databases. The application program interface allows for encoding access request statements in structured query language (SQL) that are then passed to the program that manages the database. This program returns the results through a similar interface. JDBC is very similar to the SQL Access Group's Open Database Connectivity (ODBC) and, with a small "bridge" program, the JDBC interface can be used to access databases through the ODBC interface. Module 4 is invoked upon every request from the client.

(e) The database 336 is used to store the virus log and calculate the real-time data. The database is generally configured to only keep the past 30 days of information for calculations. Older information can be scheduled for transfer to another storage medium. The database protocol includes an ODBC connection. The database running interval is approximately every 10 seconds.

Privacy issues are of concern for many companies (or individuals) that might use such a system. In order to accurately track viruses worldwide, the anti-virus scanning service users are required to report back certain information about what viruses were found on their particular computers. Many such users might not wish for anybody outside of the company to know that their computers were infected. Additionally, many companies are averse to having programs downloaded that are capable of scanning the receiving computer, and deriving identifying information from the scan.

Privacy concerns are alleviated by the present system, in large part, by only requiring the user to report back their country. The WVTC program will not log any IP addresses, or anything else that might be related to the identity of the client. Further the anti-virus scanning program is relatively small (i.e., 850K) and resides only in the temporary file area of the client computer. When the client comes back to the anti-virus scanning website (i.e. HouseCall), the website quickly detects whether the client already has the program file, and only updates the program or pattern files as needed in order to complete an up-to-date virus scan. The only client information sent back includes three pieces of information: (1) virus name, (2) count of the virus, and (3) location of the computer (as selected by the user via a drop-down menu or the like).

The World Virus Tracking center results in a display of virus tracking information, most commonly taking the form of geographic maps or the like, which indicate virus activity for the various areas on the maps. A series of example webpages from the Trend Micro Incorporated website are shown in FIGS. 4A through 4K. The tracking information could be displayed in any of a variety of different ways, without being limited by these examples provided.

Figure 4A:
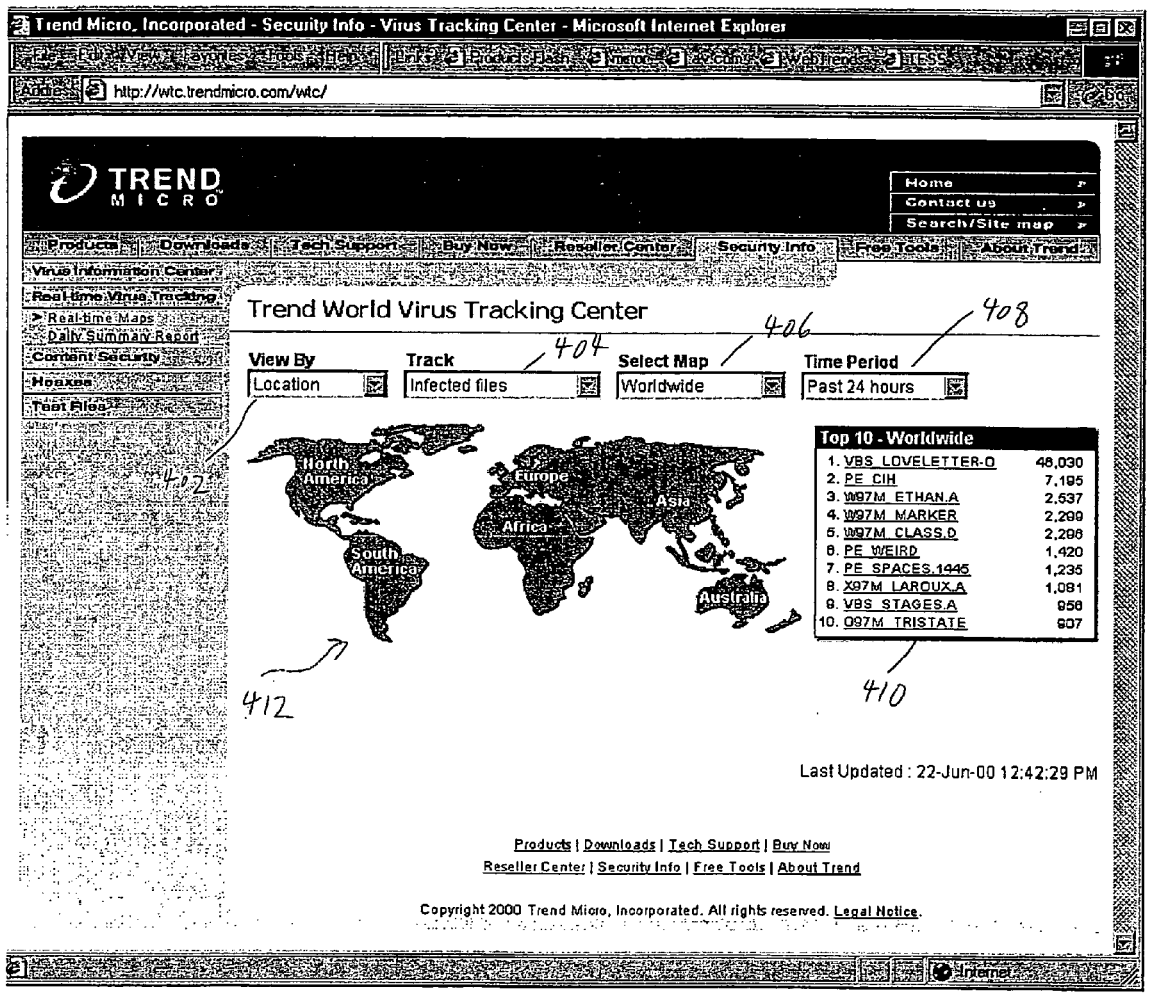
FIGS. 4A-4L show certain representative website screenshots for displaying and tracking the scanned virus information on a real-time basis.

FIG. 4A shows four pulldown menus 402, 404, 406 and 408. The "View By" menu 402 allows the user to select how the information is to be displayed, such as by location, or by virus name. The location menu can further include a pull-down list of 6 major continents, followed by major countries in that continent. If a location (or any other menu item) is not selected, it can be set to a default value. The "Track" menu 404 allows the user to select what type of information to track, i.e., infected files, infected computers, and so forth. The "Select Map" menu 406 allows the user to choose type of map, i.e., worldwide, North America, South America, and so forth. The map is displayed in the working area 412. The "Time Period" menu 408 allows the user to select how far back in time the virus tracking should extend, i.e., past 30 days, past 24 hours, past 30 minutes, and so forth. A display block 410 is shown to include a list of the "Top 10—World-wide" viruses found. The first column includes the common name of the virus. The second column includes the infection rate (i.e., number of files, or number of computers).

Figure 4B:
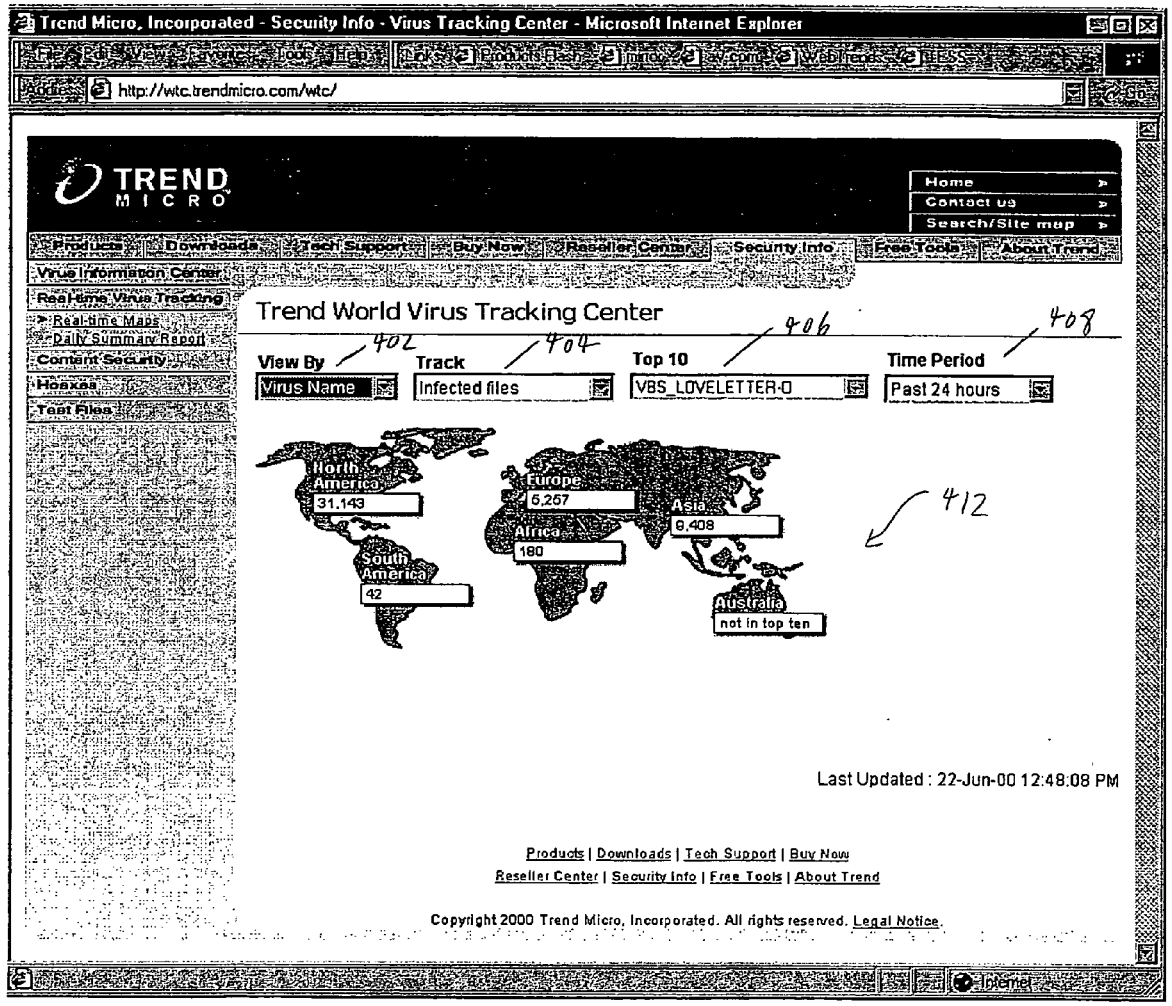

FIG. 4B shows an alternative display where the view by menu 402 is set to the virus name, the track menu 404 is set to infected files, and time period menu 408 is set to the past 24 hours. The virus name selection brings up another pull-down menu for the "Top 10" viruses (i.e. VBS Loveletter, or the like). In the working area 412, instances of the selected virus, for the given time-frame, are displayed on the current map. For instance, North America is shown to have over 31,000 instances of the selected virus name, while Australia is shown to not be in the top ten.

Figure 4C:
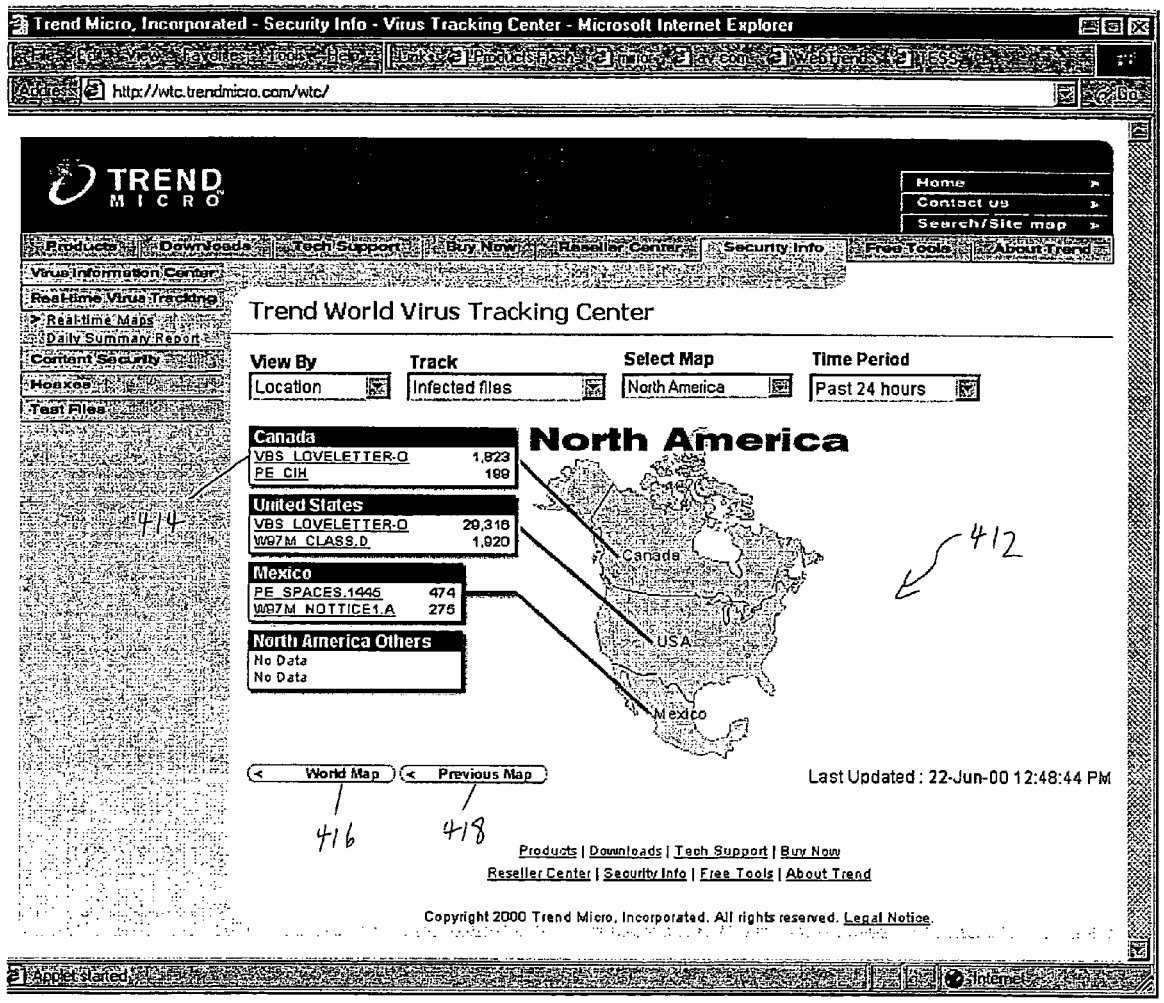
Figure 4D:
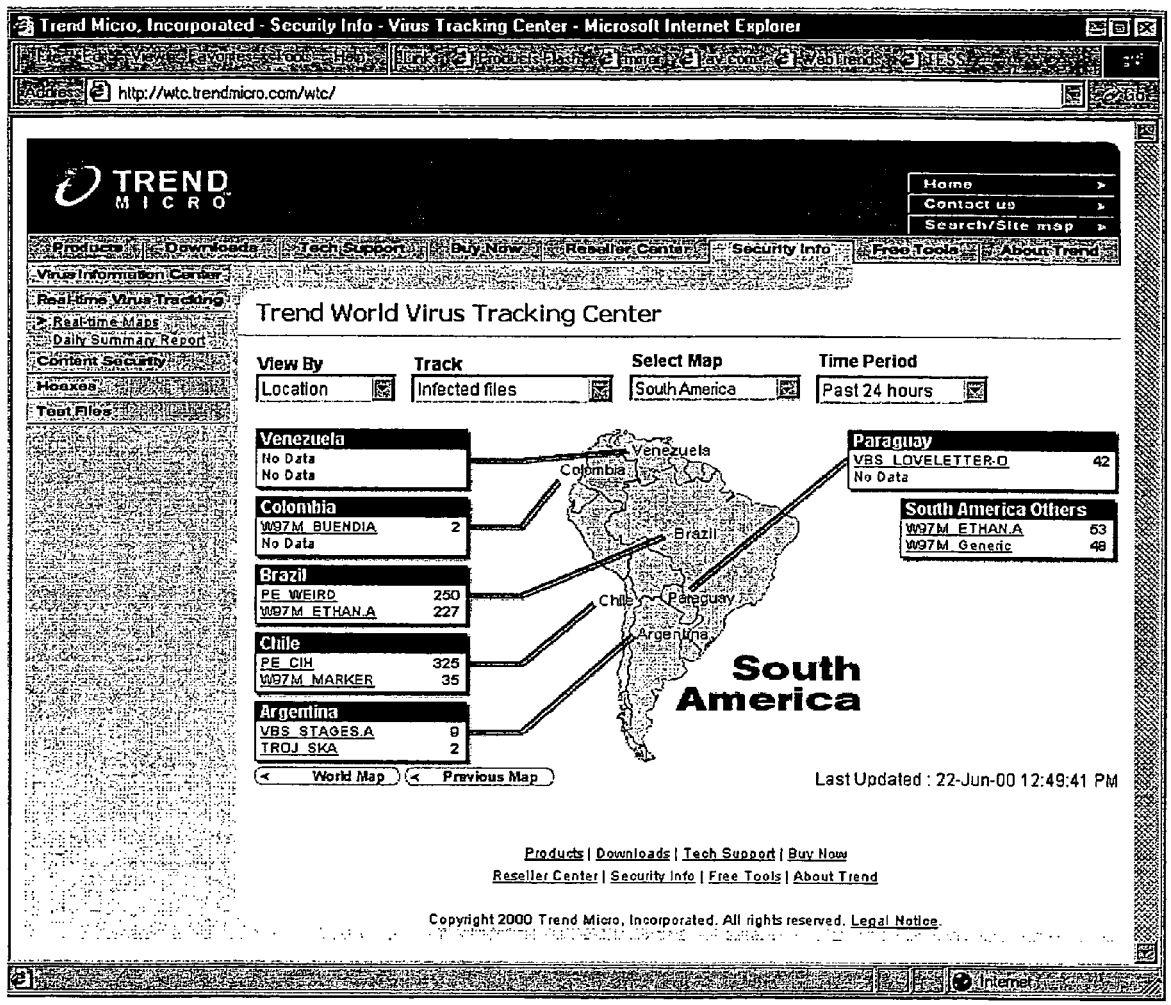
Figure 4E:
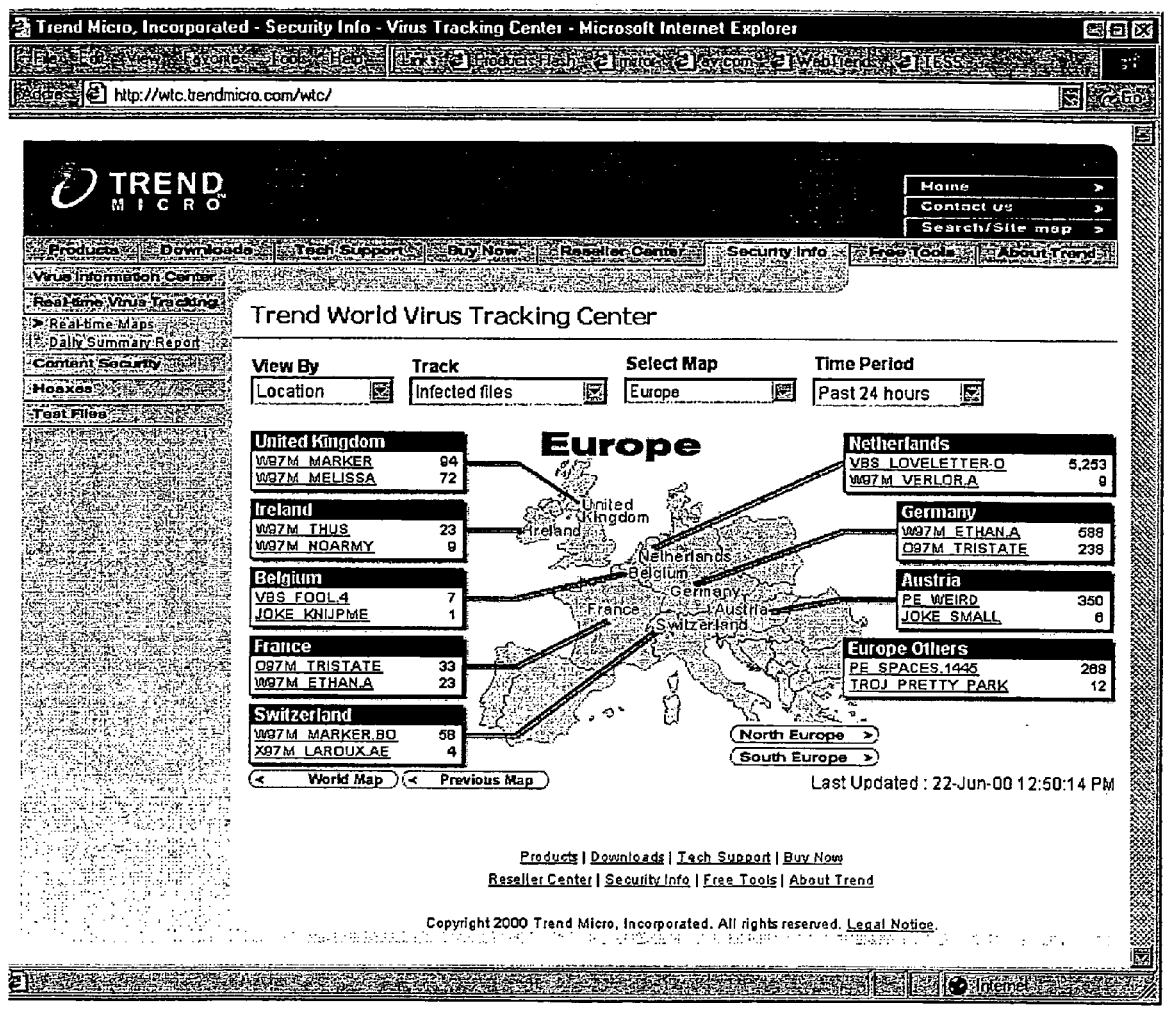
Figure 4F:
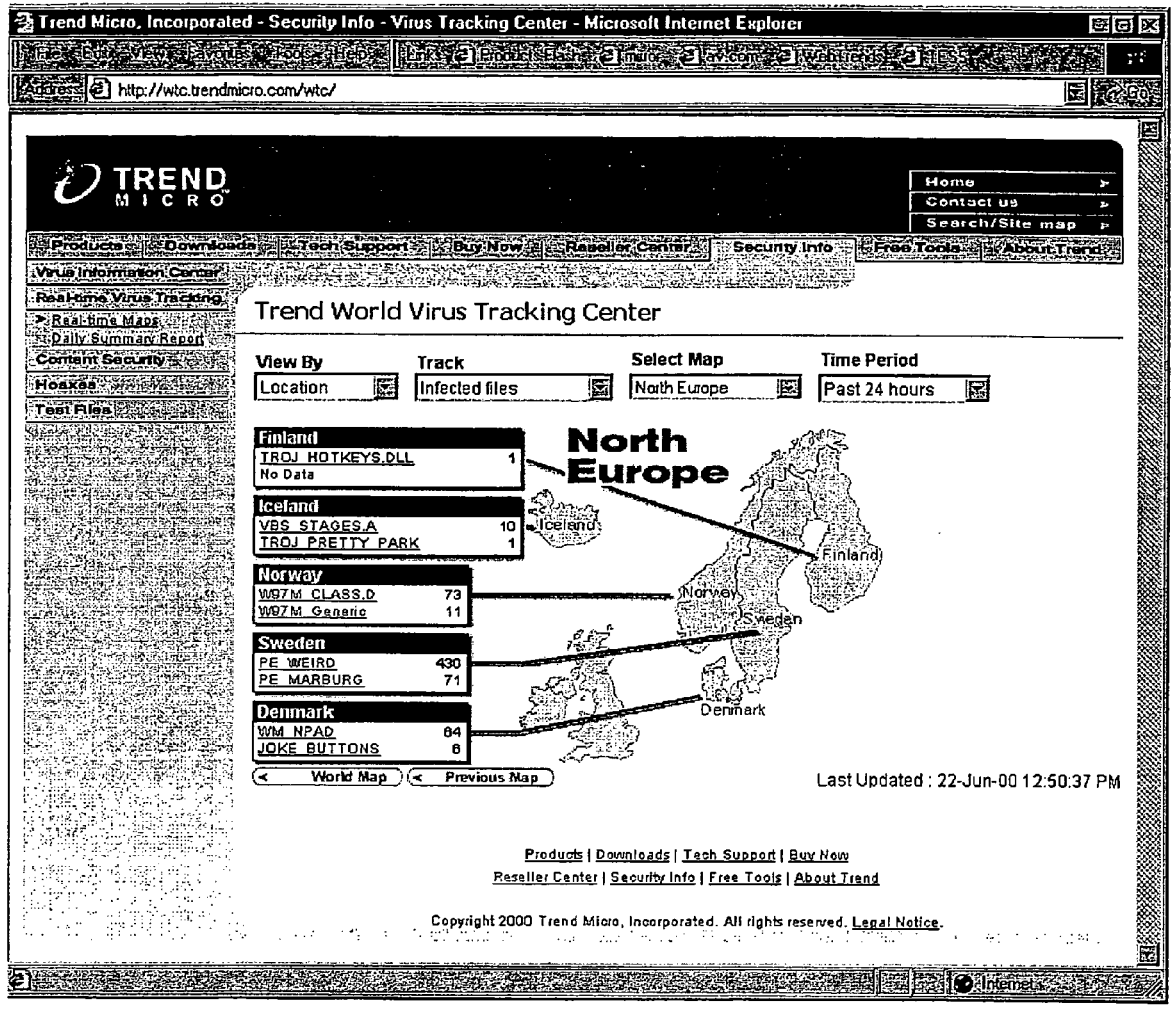
Figure 4G:
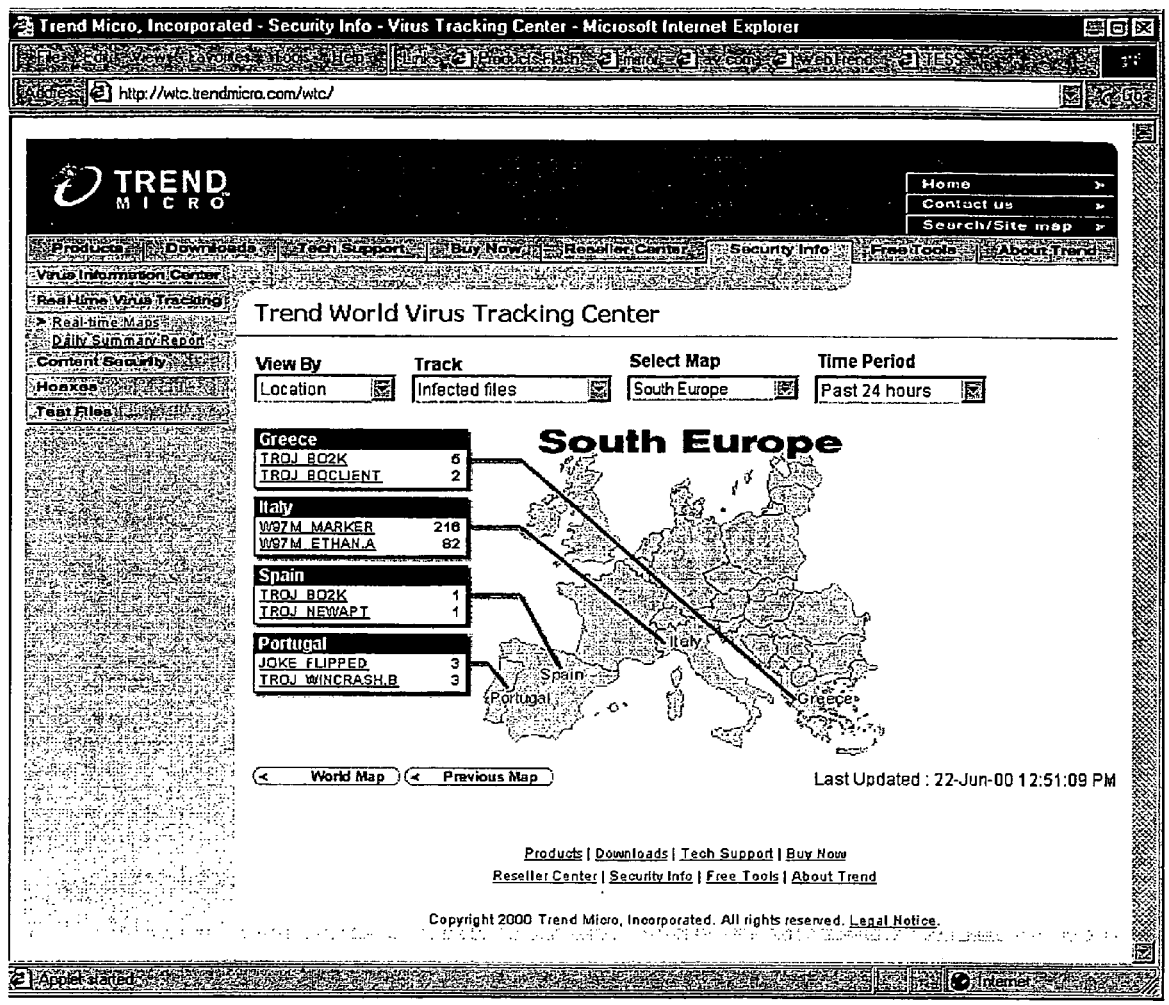
Figure 4H:
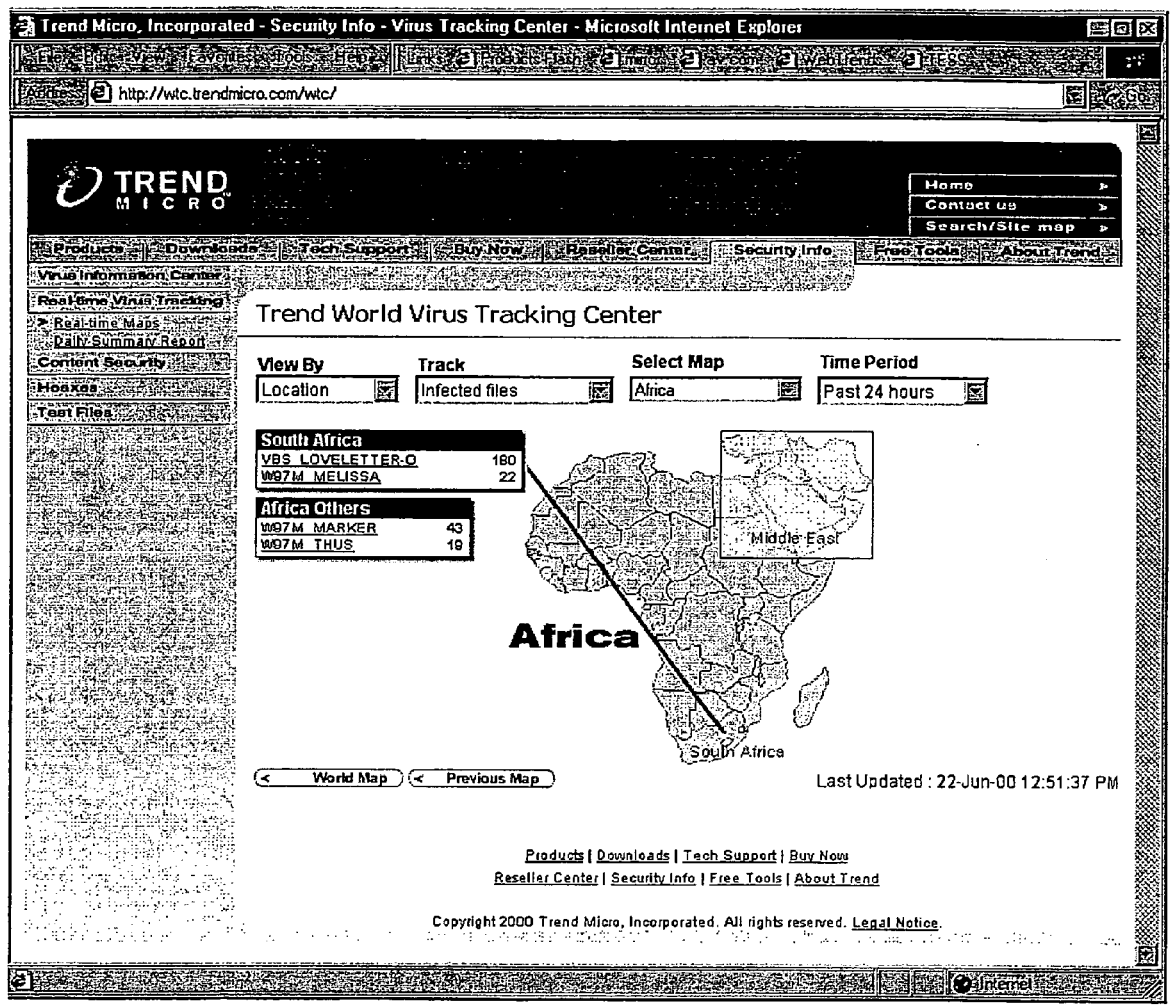
Figure 4I:
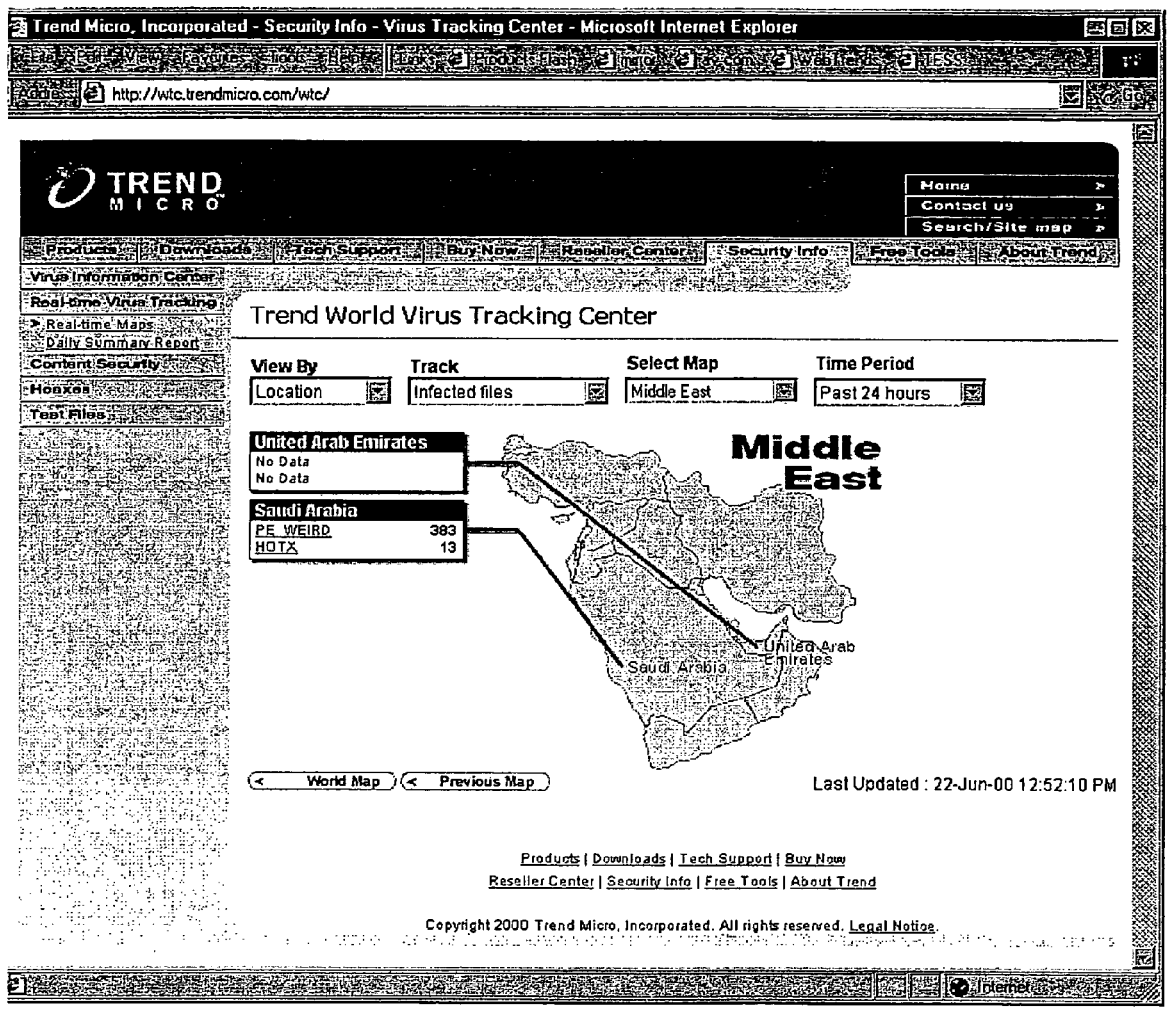
Figure 4J:
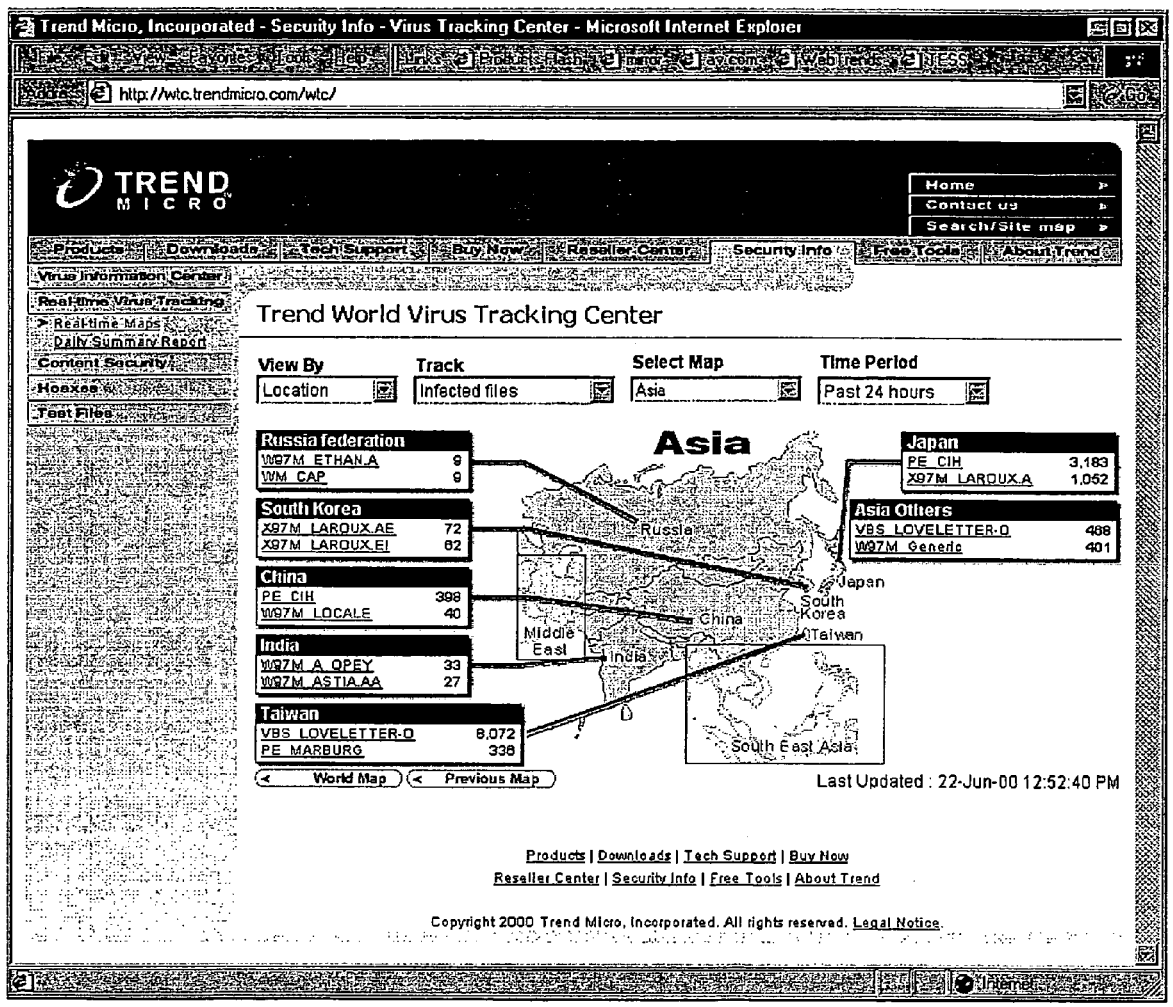
Figure 4K:
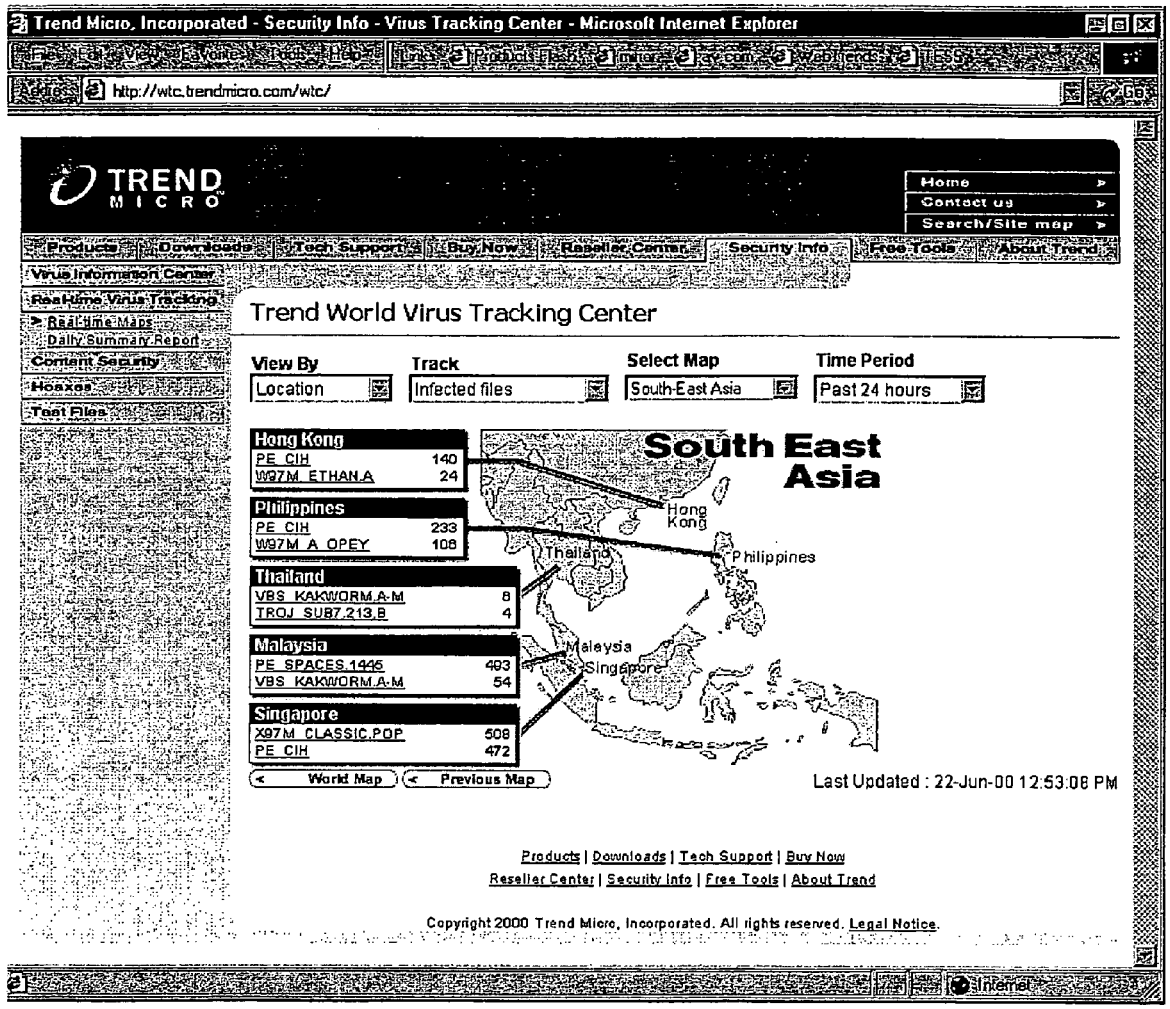
Figure 4L:
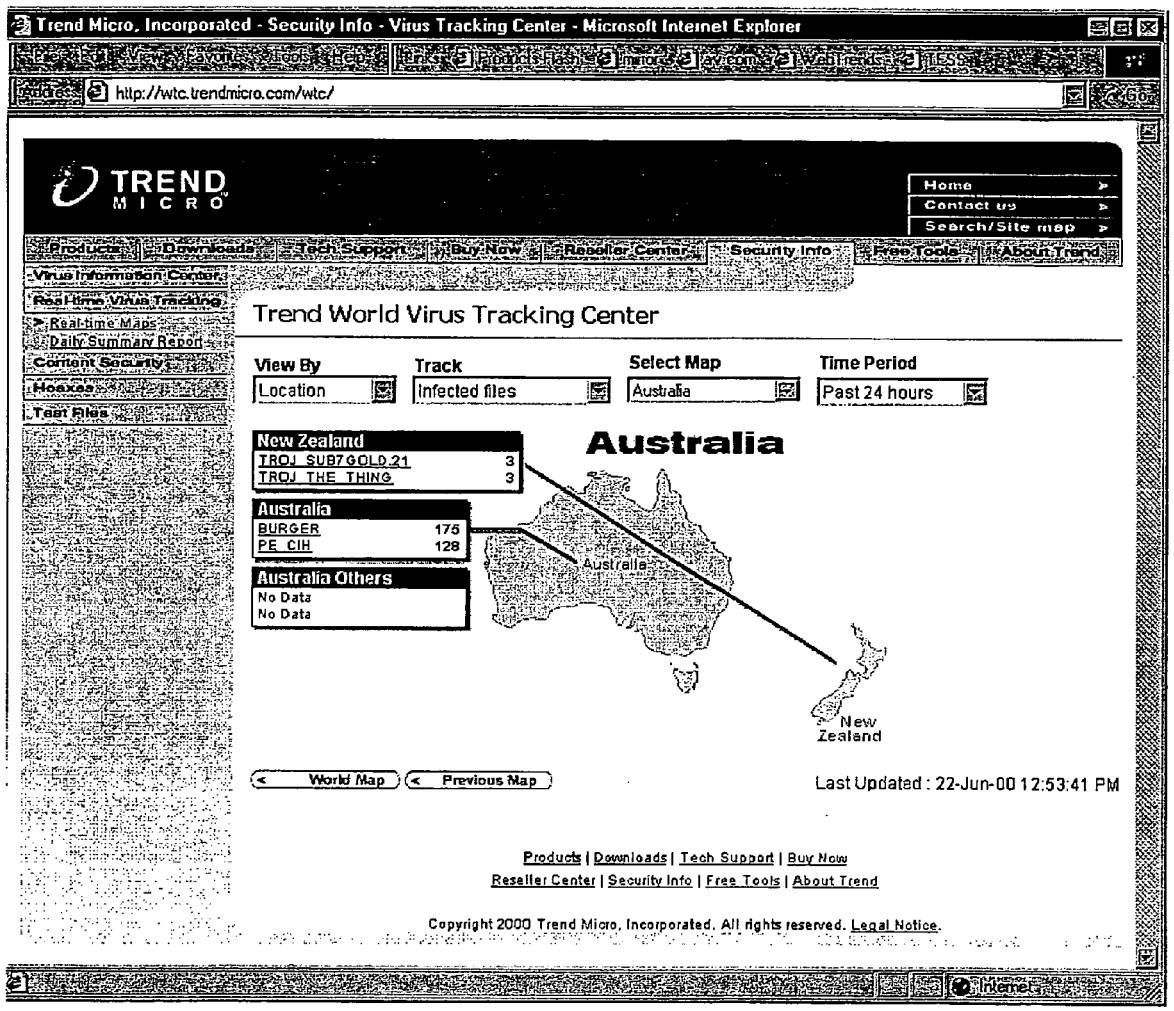

FIG. 4C shows another alternative display, wherein the selected map includes North America. The pointing device or mouse is used to pinpoint various areas on the map area 412. A display block, such as 414 associated with Canada, is shown for each geographical area. The block 414 might list any number of virus names, and instances of occurrence (infected files) associated with that geographical area. Click-through areas "World Map" 416 and "Previous Map" 418 are included to navigate through tracking at different levels. FIGS. 4D through 4L show similar displays for the following respective geographical areas: South America, Europe, North Europe, South Europe, Africa, Middle East, Asia, South East Asia, and Australia. In each instance, the virus activity levels for the various geographic regions will be updating continually—on a real-time basis—as new data comes into the WVTC server and associated WVTC Database.

Figure 5:
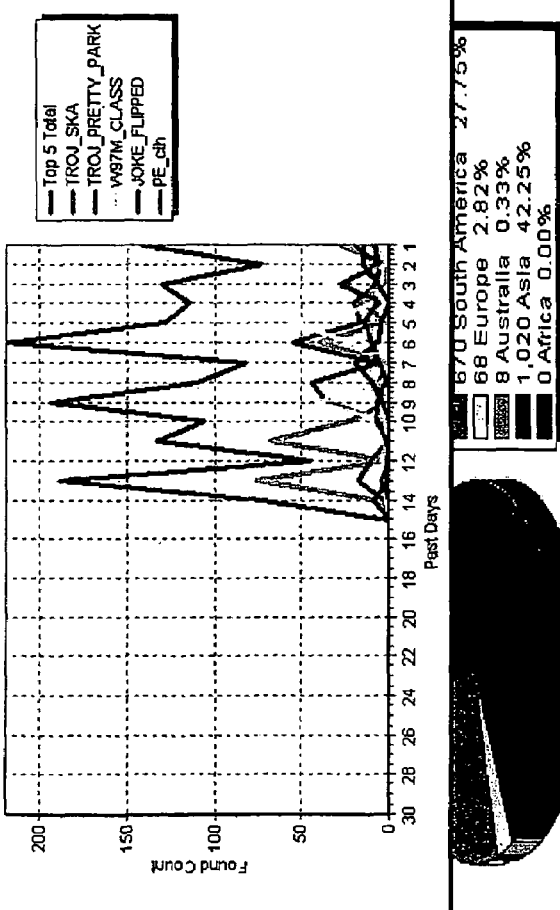
FIG. 5 shows a representative graphical display of virus activity over a given period.
Figure 5:
Figure 5:
Figure 5:
Figure 5:

FIG. 5 shows a graph 502 of the most prevalent viruses during the past 30 days. This chart is configured to track worldwide virus counts of the current top 5 viruses for the past thirty days. This chart is intended to demonstrate that once the virus data is collected, it can be displayed in many different forms, on both a static and real-time basis.

The present virus tracking system provides obvious benefits to the user, in that virus scanning (and eradication) on the user's computer can be achieved through contacting a website (such as HouseCall or eDoctor). ISP and/or website providers will derive benefits from including such services on their websites (as a hosted application, or URL to an anti-virus scanning site). The addition of such security tools provides a value-added service to their site, and enhances the security image of the company. Moreover, since the user must visit the anti-virus scanning website in order to invoke the scan, the ISP/website can increase visitation and/or hit-rates associated with their site.

The resulting information can be used for virus research, or law enforcement. Experts in the field can use the information to analyze worldwide virus trends as they occur. This should provide faster, and more proactive responses during virus outbreaks (such as the recent "Melissa" and "I Love You" virus scares) to customers of the system (and otherwise). Faster and more-effective anti-virus solutions can thereby be derived come from better (real-time) understanding of virus distribution trends.

Note that the present invention has been described in terms of real-time tracking of computer virus patterns by using a central tracking authority. However, the present invention might also be used to track the occurrence of other types of phenomenon (other than computer viruses). If any distributed occurrence of an event is fed back to the central tracking authority on a real-time basis (via the web, phone, wireless, or other means), then that event can be tracked (and displayed) in real-time by contacting the central tracking authority. The Internet provides an ideal medium for such tracking since it is distributed, fast, and can provide real-time feedback (with proper connections).

Hence, although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A real-time virus tracking and display system for use with a distributed computer network, the system comprising:
   a plurality of potentially infected client end-user computers, said end-user computers being distributed over said distributed computer network;
   a first anti-virus scanning server executing software from a first vendor and a second anti-virus scanning server executing software from a second vendor, each accessible via the distributed computer network, said first anti-virus scanning server and said second anti-virus scanning server each including an anti-virus scanning program, whereby client users contact the first scanning server or the second scanning server to facilitate virus scanning of the client end-user computers by downloading said anti-virus scanning program;

a scan log which is sent back to at least one of the first anti-virus scanning server and the second anti-virus scanning server over said distributed computer network from each client user, the scan log containing a virus name and a location of the end-user computer, wherein only location data is related to the identity of the end-user computer;

a virus-tracking server for receiving the scan log information from said client end-user computers in real-time via the first anti-virus scanning server from the first vendor and the second anti-virus scanning server from the second vendor, wherein the virus-tracking server is operable with a plurality of anti-virus scanning servers and anti-virus scanning programs;

a database server associated with the virus-tracking server for processing the scan log information into virus-tracking information; and at least one virus tracking display mode accessible by a tracking user from the virus tracking server, the display mode providing real-time updates of said virus tracking information pertaining to the scan logs, wherein the anti-virus scanning program residing at the client end-user computers generates one or more maps displaying the real-time updates, and wherein the one or more maps are generated and displayed at the client end-user computers include a view menu, a track menu, a select menu, and a time period menu and a display block showing worldwide virus infection rates and wherein the anti-virus scanning program generates a virus count graph showing static counts of prevalent viruses worldwide during a predetermined time frame.

2. The system according to claim 1, wherein the tracking user can configure the display modes to show the virus-tracking information in association with user-selected geographic maps of where the viruses are occurring.

3. The system according to claim 2, wherein the display modes includes a plurality of web pages with user selectable menus to configure the virus tracking display mode on the pages.

4. The system according to claim 1, wherein the scan log information contains no information relating to the direct identification of the client user.

5. The system according to claim 4, wherein the scan log information includes the name of the virus, the frequency of its occurrence, and the geographic location of the infected computer.

6. The system according to claim 1, wherein a servlet program on the virus-tracking server is used to receive the scan log information from the at least one anti-virus scanning server.

7. The system according to claim 1, wherein a polling program is used to regularly retrieve the virus tracking information from the database server and store it in a data object.

8. The system of claim 7, wherein a common gateway interface (CGI) program is used to retrieve the data object for display by the tracking user.

9. The system of claim 1, wherein a Java applet running on a tracking user browser is used to display a real-time virus trace map.

10. The system of claim 1, wherein the client user is also the tracking user.

11. The system of claim 1, wherein the distributed computer network includes the Internet, wherein said scan log from each scanned client computer is sent back over the Internet to be received by said virus tracking server, and wherein said virus tracking display mode is accessible over the Internet by said tracking user.

12. The system according to claim 1 wherein said virus tracking information identifies concentrations of a computer virus at said client end-user computer locations.

13. The system according to claim 1 wherein said scan log information is processed by aggregating said scan logs from each client end-user computer and then synthesizing said virus tracking information.

14. A method to provide real-time virus tracking and display for use with a distributed computer network, the method comprising:

providing an anti-virus scanning program to a client end-user computer from a first anti-virus scanning server executing software from a first vendor or from a second anti-virus scanning server executing software from a second vendor, each accessible via the distributed computer network;

invoking the anti-virus scanning program from a plurality of potentially infected client end-user computers by downloading said antivirus scanning program, said end-user computers being distributed over said distributed computer network;

generating a scan log from each scanned client end-user computer and sending the scan log back from each client end-user computer over said distributed computer network, the scan log including virus name and a location of the end-user computer, wherein only the location relates to the identity of the end-user computer, thereby maintaining the privacy of the plurality of client users;

receiving the scan log information from said client end-user computers in real-time at the first anti-virus scanning server and the second anti-virus scanning server and transmitting the scan log information to a virus tracking server associated with the distributed computer network capable of operating with anti-virus scanning servers from multiple vendors;

processing the scan log information into virus tracking information and storing it on a database server associated with the virus-tracking server; and retrieving the virus tracking information from the virus-tracking server; and displaying a real-time trace on the client end-user computer using the anti-virus scanning program, wherein real-time trace data are displayed in one or more maps generated by the anti-virus scanning program on the client end-user computer; and enabling a client user to select from one or more maps a view menu, a track menu, a select menu, and a time period menu and a display block showing worldwide virus infection rates and wherein the anti-virus scanning program generates a virus count graph showing static counts of prevalent viruses worldwide during a predetermined time frame.

15. The method according to claim 14, which further includes configuring display modes by the tracking user to show the virus-tracking information in association with user-selected geographic maps of where the viruses are occurring.

16. The method according to claim 15, which further includes displaying the display modes via a plurality of web pages with user selectable menus to configure the virus-tracking information on the pages.

17. The method according to claim 14, wherein the scan log contains no information relating to the direct identification of the client user.

18. The method according to claim 17, wherein the scan log includes the name of the virus, the frequency of its occurrence, and the geographic location of the infected computer.

19. The method according to claim 14, which further includes providing a servlet program on the virus-tracking server to receive the scan log from the at least one anti-virus scanning server.

20. The method according to claim 14, which further includes providing a polling program to regularly retrieve virus tracking information from the database server and store it in a data object.

21. The method of claim 20, which further includes providing a common gateway interface (CGI) program to retrieve the data object for display by the tracking user.

22. The method of claim 14, which further includes running a Java applet on the browser of the tracking user device to display a real-time virus trace map.

23. The method of claim 14, wherein the client user is also the tracking user.

24. The method of claim 14, wherein the distributed computer network includes the Internet, wherein said scan log from each scanned client computer is sent back over the Internet to be received by said virus tracking server, and wherein said real-time trace displayed on said tracking user device is made available over the Internet.

25. The method according to claim 14 wherein said virus tracking information identifies concentrations of a computer virus at said client end-user computer locations.

26. The method according to claim 14 wherein processing said scan log information includes
- aggregating said scan logs from each client end-user computer, and
- synthesizing said virus tracking information from said aggregated scan logs.

* * * * *

US007496960C1

(12) EX PARTE REEXAMINATION CERTIFICATE (7867th)
United States Patent
Chen et al.

(10) Number: US 7,496,960 C1
(45) Certificate Issued: Nov. 9, 2010

(54) TRACKING AND REPORTING OF COMPUTER VIRUS INFORMATION

(75) Inventors: Eva Chen, Pasadena, CA (US); Jimmy Sun, Cupertino, CA (US); Terrence Chou, Taipei (TW); Steven Deutsch, San Francisco, CA (US); Mark Havran, San Jose, CA (US)

(73) Assignee: Trend Micro Incorporated, Cupertino, CA (US)

Reexamination Request:
No. 90/010,853, Feb. 6, 2010

Reexamination Certificate for:
Patent No.: 7,496,960
Issued: Feb. 24, 2009
Appl. No.: 09/702,289
Filed: Oct. 30, 2000

(51) Int. Cl.
*G06F 11/00* (2006.01)
*G06F 12/14* (2006.01)
*G06F 12/16* (2006.01)
*G06F 15/18* (2006.01)
*G08B 23/00* (2006.01)

(52) U.S. Cl. ........................................................ 726/22
(58) Field of Classification Search ................. 726/22
See application file for complete search history.

(56) References Cited

U.S. PATENT DOCUMENTS 6,275,937 B1    8/2001   Hailpern et al.

OTHER PUBLICATIONS

"Taking Virus Protection into the 21st Century", Trend Micro White Paper, published in 1998 (available online at: www.windowsecurity.com/uplarticle/10/21stcent.doc and available as of 1998—See internet archive reference at: http://web.archive.org/web/19981202091048/www.antivirus.com/corporate/white/index.htm).

"Trend Micro Announces New Centrally Controlled Desktop Virus Protection", May 26, 1998, Trend Micro Press Release (available online at: http://trendmicro.mediaroom.com/index.php?s=43&item=571).

"Trend Micro Introduces Ground Breaking Virus Control", Apr. 20, 1998, Trend Micro Press Release (available online at: http://trendmicro.mediaroom.com/index.php?s=43&item=573).

"Statistical Dowsing Rods", by Rob Rosenberger, Oct. 8, 1999 (available on–line at: http://www.vmyths.com/column/1/1999/10/8/).

*Primary Examiner*—Majid A. Banankhah

(57) ABSTRACT

An apparatus and method for providing real-time tracking of virus information as reported from various computers on a distributed computer network. Each client computer on the distributed network contacts an anti-virus scanning site. The site provides a small program or applet that resides in temporary memory of the client computer. The client-user invokes the scan with supplied pattern updates for detecting recent viruses. When the scan has been completed, the user is prompted to supply a country of origin. The name of the virus, its frequency of occurrence, and the country are forwarded as a virus scan log to a virus tracking server, which receives the virus information and thereafter stores it in a database server, which is used to further calculate virus trace display information. A tracking user contacts the virus tracking server and receives map information, which traces the virus activity. The maps show, according to user preference, the names of the viruses encountered in each country, and their frequencies of occurrence.

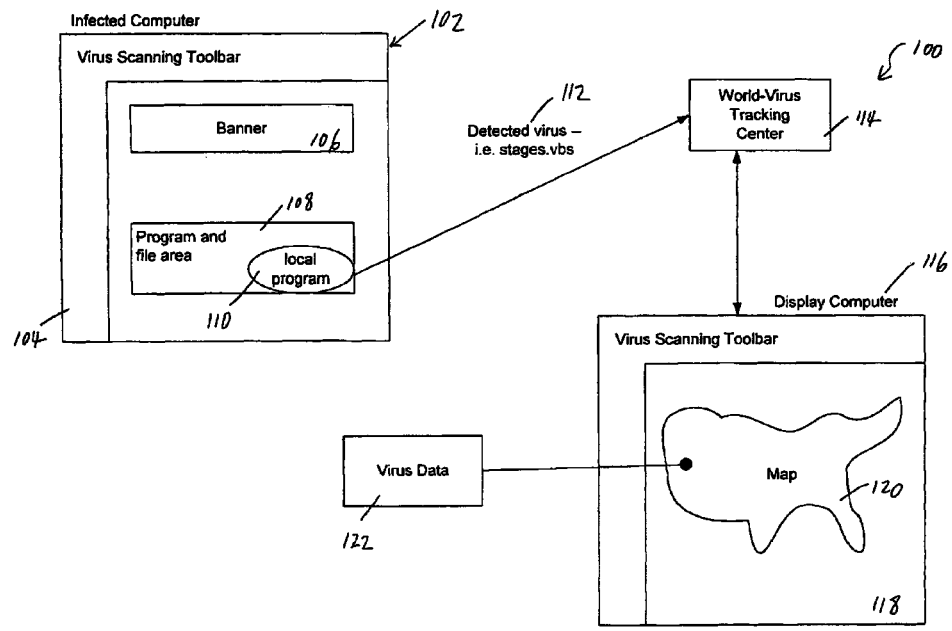

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-26 is confirmed.

* * * * *